Figure 1:
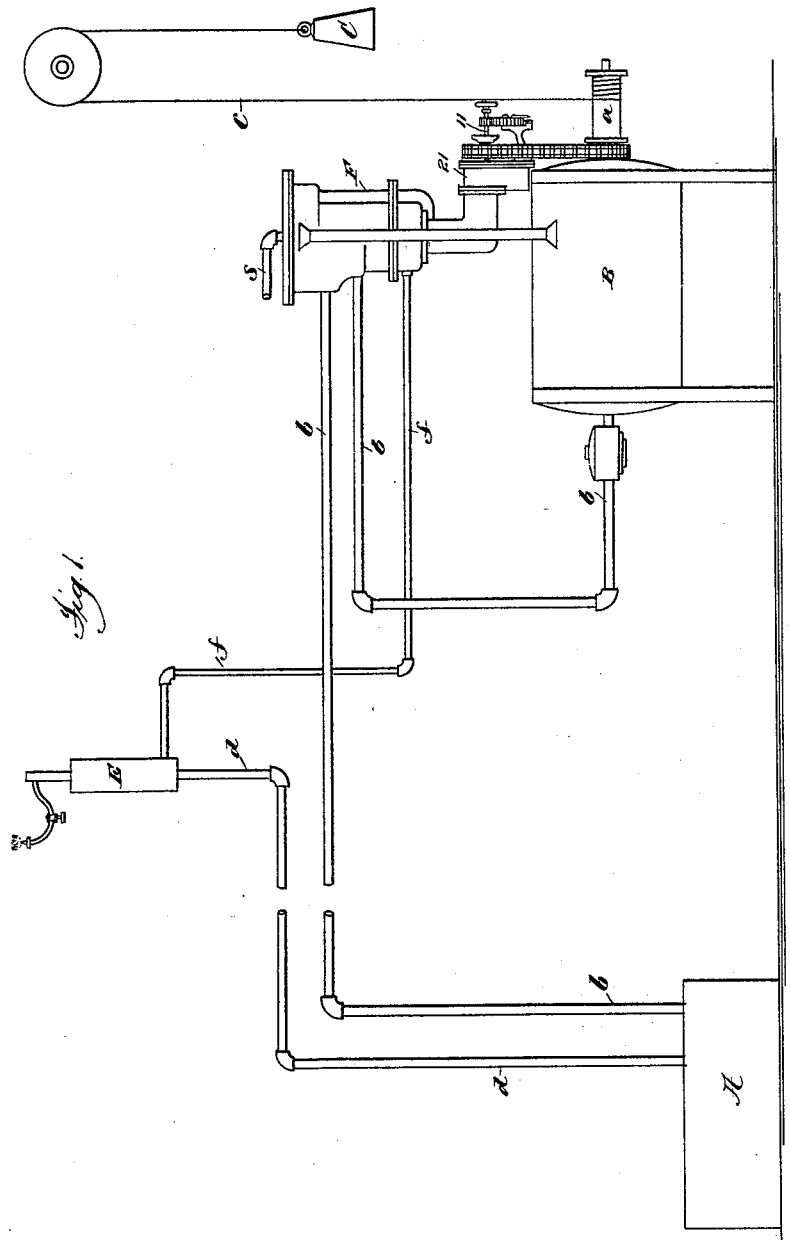

(No Model.) 2 Sheets—Sheet 1.

E. D. SELF.
GAS MACHINE.

No. 397,205. Patented Feb. 5, 1889.

Attest:
Geo. H. Botts
T. H. Palmer

Inventor:
Edward D. Self
by Philipp Philps & Hovey
Attys

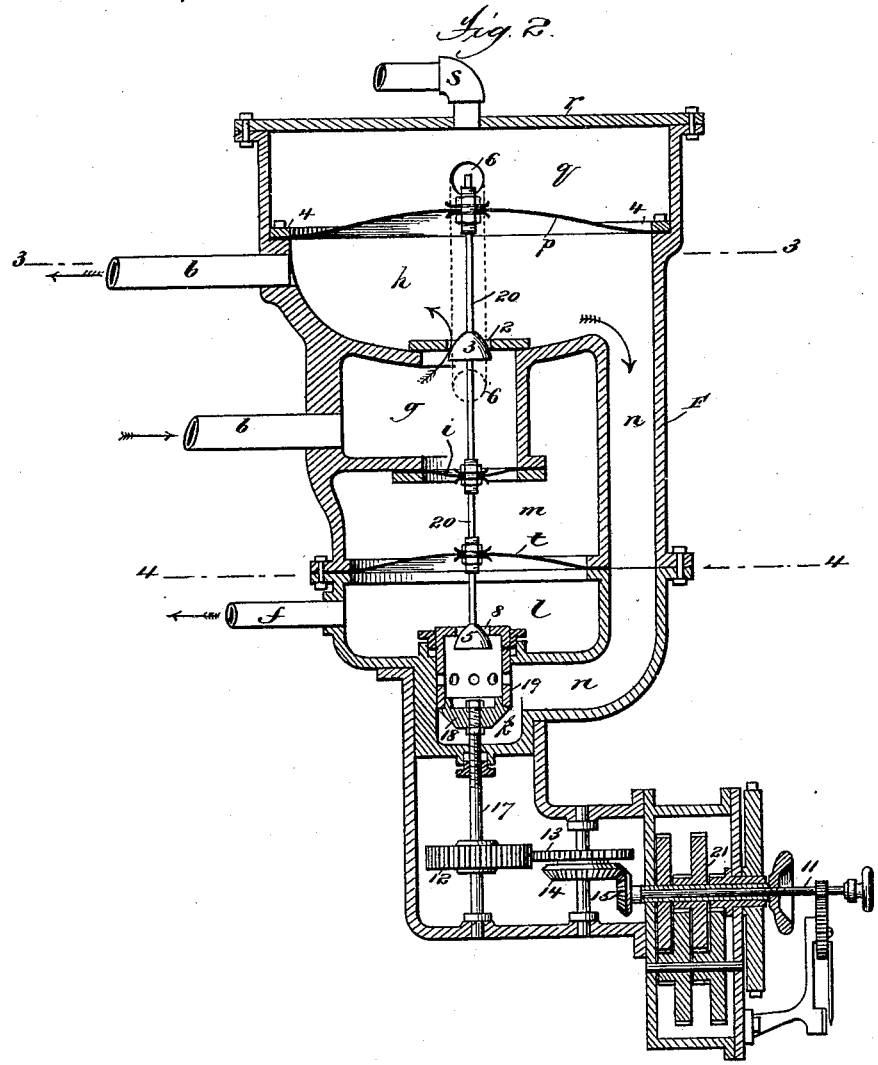

UNITED STATES PATENT OFFICE.

EDWARD D. SELF, OF SOUTH ORANGE, NEW JERSEY.

GAS-MACHINE.

SPECIFICATION forming part of Letters Patent No. 397,205, dated February 5, 1889.

Application filed January 9, 1888. Serial No. 260,131. (No model.)

*To all whom it may concern:*

Be it known that I, EDWARD D. SELF, a citizen of the United States, residing at South Orange, county of Essex, and State of New Jersey, have invented certain new and useful Improvements in Gas-Machines, fully described and represented in the following specification and the accompanying drawings, forming a part of the same.

This invention relates to the manufacture of gas according to those processes in which atmospheric air is enriched or saturated with the vapor of a volatile hydrocarbon to produce what is popularly known as "illuminating-gas," and which will, therefore, for convenience, be herein termed "gas."

In the manufacture of this class of gas atmospheric air is caused to pass through a closed vessel, called a "carburetor," which contains a net-work of burlap, canton-flannel, or other absorbent material, which is saturated with gasoline or other volatile hydrocarbon. The air in passing through the interstices of the absorbent material becomes saturated with the volatile hydrocarbon, and thus produces a gas suitable for illumination.

In making gas in this manner it has been found that when the operation is commenced and the material in the carburetor is saturated with the most volatile portions of the hydrocarbon the air passed through the carburetor becomes saturated with a vapor which is very rich in carbon, and as a consequence the gas made during this part of the operation when burned gives off a large amount of smoke. As the gas-making continues, however, the hydrocarbon in the carburetor becomes less and less volatile, and as a consequence the amount of carbon contained in the gas produced gradually diminishes until the carburetor is exhausted.

To avoid the smoke resulting from the excess of carbon which enters the gas during the first part of the operation, it has been proposed to introduce a sufficient quantity of pure air into the gas to reduce or dilute it to such an extent that it will burn without producing smoke.

In prior applications for Letters Patent filed by me in the Patent Office on February 11, 1887, Serial No. 227,249, and July 19, 1887, Serial No. 244,686, I have shown and described a regulating apparatus by which the amount of pure air introduced into the gas during the different periods of the gas-making is so graduated that the air introduced is at all times just sufficient to properly dilute the gas and reduce it to such a condition that it will not produce smoke in burning.

The present invention relates to certain improvements in the construction and organization of the apparatus shown in my said applications, and has for its object to secure a more accurate automatic regulation of the amount of pure air introduced into the gas to conform to temporary variations in the rate of production and consumption.

In the organization shown in my said prior applications the air which is to be treated to produce the gas is forced by a pump through the carburetor, and after leaving the carburetor the gas passes through a mixing-chamber, into which the pure air for diluting the gas is forced directly from the pump. In order to maintain uniform pressure in the carburetor and the gas-supply pipes, the pipe through which the air passes to the carburetor or through which the gas passes from the carburetor is provided with an ordinary fluid-pressure regulator consisting of a regulating-valve controlled by a diaphragm which operates by the pressure of the air or gas in the pipes to regulate the quantity of pure air introduced into the gas to conform to temporary and abrupt changes in the rate of production or consumption, and the pipe through which the pure air passes to the mixing-chamber is provided with a similar regulator. In practice it was found that this latter regulator, owing to the small volume of air passing through it, was not, unless made very delicate, sufficiently sensitive to produce as accurate results as were desirable, and I have found that this difficulty can be overcome and practically accurate results secured by so organizing the two regulators that the va: which regulates the supply of pure air to the gas will be controlled by a diaphragm which is acted on and operated by the pressure of the larger volume of air or gas, and the present invention consists in an organization by which this is effected.

As a full understanding of the invention and the manner of applying the same to actual use can be best given by a detailed description of the organization and operation of an apparatus embodying it, all further preliminary description will be omitted and a detailed description given, reference being had to the accompanying drawings, in which—

Figure 1 is a diagrammatic view illustrating the organization of a gas-machine embodying the invention. Fig. 2 is an enlarged vertical section of the regulating apparatus. Fig. 3 is a horizontal section taken on the line 3 of Fig. 2. Fig. 4 is a similar view taken on the line 4 of the same figure.

Referring to said figures, it is to be understood that A represents a carburetor of the ordinary form, and B a pump or other air-supplying apparatus, also of any of the ordinary forms. As herein shown, the air-supplying apparatus is a rotary pump, and is driven by a weight, C, which is connected by a cord, $c$, to a drum, $a$, on the shaft of the pump. The drum $a$ is connected to the shaft of the pump by a pawl and ratchet, (not shown,) so that the cord can be rewound upon the drum without revolving the pump. The pump is connected with the carburetor by a pipe, $b$, through which the air is forced from the pump to the carburetor, and the gas passes from the carburetor through a pipe, $d$, to the burners or place of storage. The pipe $b$ is provided with a branch, $f$, which communicates with a mixing-chamber, E, located in the pipe $d$, and through which a certain quantity of pure air is allowed to pass, so as to mix with the gas and properly dilute it.

Located in the pipe $b$ at its junction with the branch $f$ is the governing apparatus, which operates to regulate the pressure of the air forced through the carburetor, and also to vary the quantity of pure air introduced into the gas during the different periods of the gas-making operation to conform to the quality or richness of the gas, and also to temporary variations in the rate of production or consumption.

Referring now particularly to Figs. 2, 3, and 4, the construction and organization of the governing apparatus will be described.

This apparatus consists, primarily, of what may be termed a "double fluid-pressure regulator," which operates upon the same general principle as most of the regulators of this general class. The regulating apparatus is contained within a shell or casing which is so formed as to provide two chambers, $g$ $h$, with which the two parts of the pipe $b$ communicate. These two chambers are connected by an opening, 2, which is controlled by a downwardly-opening valve, 3, the rod 20 of which is connected to a flexible diaphragm, $p$, which closes the upper side of the chamber $h$. The edges of the diaphragm $p$ rest upon a shoulder formed on the casing or shell of the apparatus, and the diaphragm is held in place by a ring, 4, which fits down above it. The top of the casing is closed by a plate, $r$, forming a chamber, $q$, above the diaphragm, which communicates with the open air by means of a vent or pipe, $s$. The chamber $h$ communicates by a passage, $n$, with a chamber, $k$, formed in the lower part of the casing, which in turn communicates with a chamber, $l$, from which leads the branch air-pipe $f$.

The rod 20 of the valve 3 is extended downward, passing through an opening in the bottom of the chamber $g$, and carries at its lower end a downwardly-opening valve, 5, which controls the passage between the chambers $k$ $l$. The opening in the bottom of the chamber $g$, through which the rod 20 passes, is closed by a small flexible diaphragm, $i$, through which the rod passes and to which it is secured. This diaphragm is of just sufficient size to allow the rod to have the necessary longitudinal movement. A stuffing-box might be substituted for the diaphragm $i$ to secure a tight joint around the rod; but the diaphragm is preferable, because it causes less friction. The top of the chamber $l$ is in the case shown closed by a flexible diaphragm, $t$, through which the rod 20 also passes, and which is secured to the rod. By this means a closed chamber, $m$, is formed between the diaphragm $t$ and the bottom of the chamber $g$, and in order to prevent the air contained in this chamber from being confined, so as to prevent the proper operation of the diaphragm $t$, a passage, 6, is provided, which puts this chamber in communication with the chamber $q$, and thus allows a free entrance and escape for the air.

It is to be remarked that the diaphragms $p$ $t$, instead of being of the form shown, may be in the form of inverted cups having their rims sealed in reservoirs of mercury or other sealing-fluid, and also that in some cases the diaphragm $t$ may be omitted. In such case the chambers $l$ $m$ will become one chamber and the air-passage 6 will be omitted. The lower part of the casing containing the chamber $k$ will preferably be made in a separate casting, as shown, and in such case the diaphragm $t$ will be secured in position by having its edges inserted between the two parts of the casing. The upper edge of the lower part of the casing may be provided with a number of pins, as 7, which will impale the edge of the diaphragm and aid in holding it in position.

The seat 8 of the valve 5 is carried upon a tubular support, 19, which is arranged to have a vertical movement with relation to the valve and passes through a packing, 9, by which a tight joint is formed around it. The lower end of the tubular support 19 is provided with a yoke, 18, to which is swiveled a threaded rod, 17, which passes through a nut, 10, in the bottom of the regulator.

The lower end of the shaft 17 is provided with a broad-faced gear, 12, which is engaged by a gear, 13, mounted upon a vertical shaft, which also carries a bevel-gear, 14, which is in turn engaged by a bevel-gear, 15, mounted upon a horizontal shaft, 11, which receives motion from the pump-shaft through a train of gears, 21, and connections, such as described in my prior application, No. 244,686, before referred to. It is to be remarked, however, that the shaft 17 may receive motion through any other suitable form of connections or from any other source, as fully set forth in my said application.

The operation of the apparatus thus organized is as follows: The carburetor having been filled, the rod 17 will be adjusted to such position as to raise the valve-seat 8 to the proper extent above the normal position of the valve 5, and the connections will then be so adjusted that as the pump is operated the rod will be turned in its nut and gradually lower the valve-seat. The pump being then set in motion, which will be effected automatically whenever the cock or cocks controlling one or more burners are opened, the air will be forced through the pipe $b$ and enter the chamber $g$, and, passing the valve 3, will enter the chamber $h$ below the diaphragm $p$, as indicated by the arrows. From the chamber $h$ the main body of the air will continue through the pipe $b$ and enter the carburetor, and pass thence through the pipe $d$ to the mixing-chamber E. A portion of the air which enters the chamber $h$ will, however, pass into the duct $n$ and enter to the chamber $k$, and pass thence past the valve 5 to the chamber $l$ beneath the diaphragm $t$, and thence through the pipe $f$ to the mixing-chamber E, where it will mingle with and dilute the gas entering that chamber from the carburetor. At the commencement of the operation, when the carburetor has been freshly filled, the gas produced will, as before explained, require the maximum dilution, and the valve-seat 8 will therefore at the commencement of the operation be so adjusted as to allow the maximum amount of air to pass. As the operation continues, however, and the gas produced becomes poorer and requires less dilution, the movement of the pump communicated to the rod 17 will gradually lower the valve-seat 8 and reduce the area of the valve-opening, so as to gradually diminish the quantity of pure air introduced into the gas, and the parts will be so timed and adjusted that the position of the valve-seat will always be such as to admit the proper amount of air to conform to the quality of the gas produced at that time, all as more fully set forth in my prior applications hereinbefore referred to. As the pressure in the pipes $d$, $f$, and $b$ is varied by the opening and closing of the cocks of the burners or by irregularities in the action of the pumps, such variations in pressure will be at once communicated to the diaphragms $p$ $t$, and will operate said diaphragms to open or close the valves 3 5, and thus not only maintain a uniform pressure in the pipes, but cause the amount of pure air which is allowed to pass the valve 5 to conform to the number of lights burning, or, in other words, to the rate at which the gas is being made and consumed. This last-mentioned result is insured by having the two valves 3 5 controlled by a diaphragm which is subjected to the pressure of the entire volume of air delivered from the pump, and in effecting the result it is preferable that the two valves should be operated by the same rod, as shown, as in such case the two valves are always sure to occupy the proper relative positions—that is to say, the amount of air allowed to pass the valve 5 will always be a certain proportion of the whole amount which passes the valve 3. In some cases the diaphragm $t$ may be omitted; but the apparatus will be rendered more sensitive by employing the two diaphragms, as shown.

In operating gas-machines of this class it is found that the richness of the gas is affected by the changes of the temperature of the surrounding atmosphere—that is to say, as the temperature rises the hydrocarbon becomes more volatile, and as a consequence the gas produced is richer, and vice versa. The rod 20 is therefore made of a metal or composition—such, for example, as vulcanite—which has a large co-efficient of expansion by heat relatively to the other parts of the apparatus, so that the increase in the richness of the gas caused by any rise in the temperature will be counteracted by an increased amount of pure air admitted by the expansion of the rod and the consequent lowering of the valve, and vice versa.

The matter relating to regulating and varying the quantity of pure air introduced into the gas to conform to the quality of the gas produced during different periods of the gas-making operation is not herein claimed, as such matter is claimed in my prior applications, Serial Nos. 227,249 and 244,686, hereinbefore referred to.

What I claim is—

1. In a gas-machine, the combination, with the carburetor and the pipe for supplying air thereto, of the pipe for supplying pure air to the gas, a regulating-valve for controlling the amount of pure air admitted, and a diaphragm connected to said valve and subjected to and operated by the pressure of the air passing to the carburetor, substantially as described.

2. In a gas-machine, the combination, with the carburetor and the pipe for supplying air thereto, of the pipe for supplying pure air to the gas, a regulating-valve for controlling the amount of air admitted to the carburetor, a regulating-valve for controlling the amount of pure air admitted to the gas, and a diaphragm subjected to and operated by the pressure of the air admitted to the carburetor and connected to and controlling both of said valves, substantially as described.

3. In a gas-machine, the combination, with the carburetor and the pipe for supplying air thereto, of the pipe for supplying pure air to the gas, a regulating-valve for controlling the amount of air admitted to the carburetor, a regulating-valve for controlling the amount of pure air admitted to the gas, a valve-rod carrying both of said valves, and a diaphragm connected to said rod and subjected to and operated by the pressure of the air admitted to the carburetor, substantially as described.

4. In a gas-machine, the combination, with the carburetor and the pipe for supplying air thereto, of the pipe for supplying pure air to the gas, a regulating-valve for controlling the amount of air admitted to the carburetor, a regulating-valve for controlling the amount of pure air admitted to the gas, a valve-rod carrying both of said valves, a diaphragm connected to said rod and subjected to and operated by the pressure of the air admitted to the carburetor, and the diaphragm $i$, for forming a tight joint around the rod, substantially as described.

5. In a gas-machine, the combination, with the carburetor and the pipe for supplying air thereto, of the pipe for supplying pure air to the gas, a regulating-valve for controlling the amount of air admitted to the carburetor, a regulating-valve for controlling the amount of pure air admitted to the gas, a valve-rod carrying both of said valves, a diaphragm connected to said rod and subjected to and operated by the pressure of the air admitted to the carburetor, and a second diaphragm, also connected to said rod and subjected to and operated by the pressure of the pure air admitted to the gas, substantially as described.

6. In a gas-machine, the combination, with a carburetor, the pipe $b$, for supplying air thereto, and the pipe $f$, for supplying pure air to the gas, of the regulating apparatus having the chambers $g\ h$, communicating with the two parts of the pipe $b$, the chamber $l$, communicating with the pipe $f$, the duct $n$, and chamber $k$, affording communication between the chambers $h\ l$, the diaphragm $p$, the rod 20, connected to the diaphragm, and the valves 3 5, connected to said rod and controlling the passages between the chambers $g\ h$ and $k\ l$, respectively, substantially as described.

In testimony whereof I have hereunto set my hand in the presence of two subscribing witnesses.

EDWARD D. SELF.

Witnesses:
J. J. KENNEDY,
G. M. BORST.